May 14, 1968     R. L. TURPEN     3,382,998
CARGO CONTAINER WITH SIDE DOOR
Filed Feb. 1, 1966     2 Sheets-Sheet 1
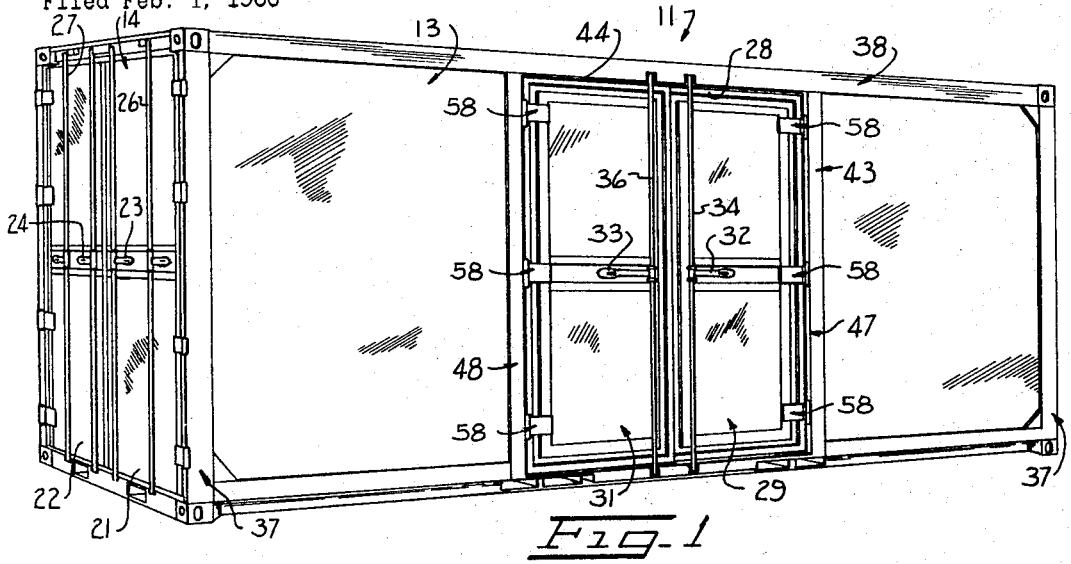
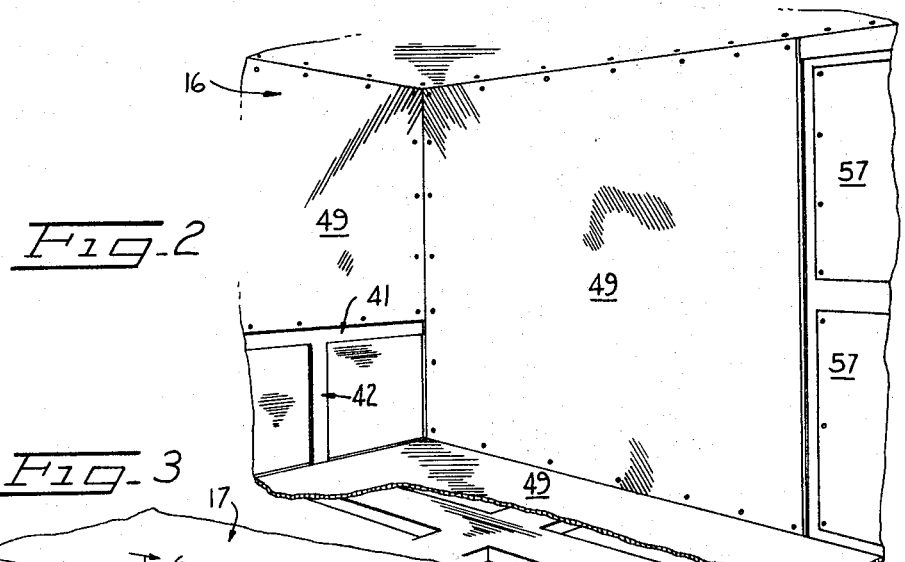
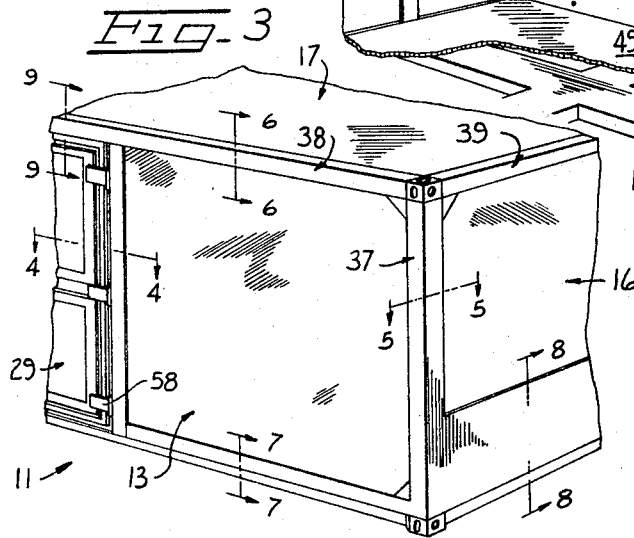
INVENTOR.
RUSSELL L. TURPEN
BY
Gardner & Zimmerman
ATTORNEYS

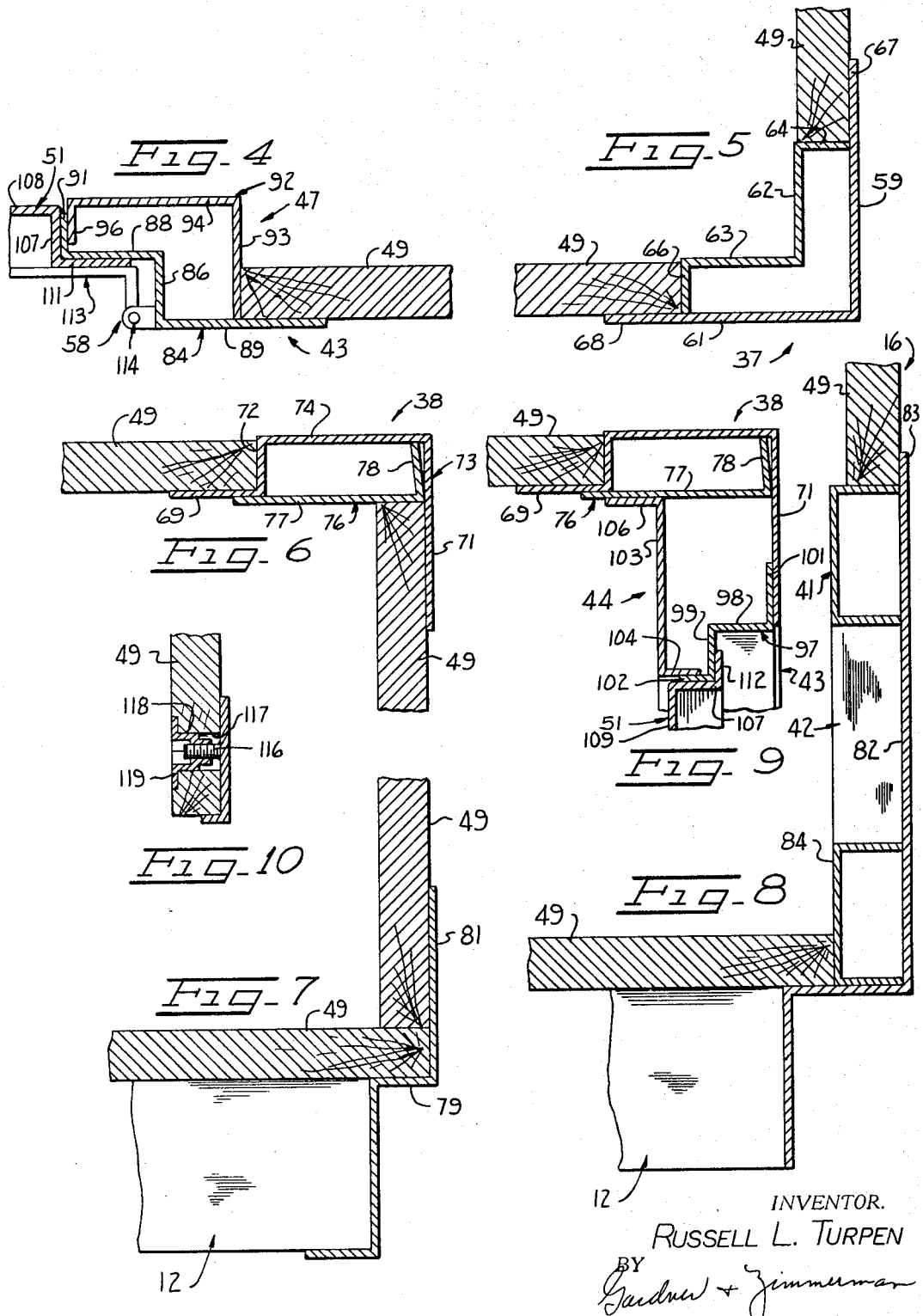

United States Patent Office 3,382,998
Patented May 14, 1968

3,382,998
CARGO CONTAINER WITH SIDE DOOR
Russell L. Turpen, North Richmond, Calif., assignor to Compass Container Company, Inc., Richmond, Calif., a corporation of California
Filed Feb. 1, 1966, Ser. No. 524,233
9 Claims. (Cl. 220—1.5)

ABSTRACT OF THE DISCLOSURE

A cargo container of the type adapted for conveyance on ships, rail cars, or truck trailers is described which has side doors of sufficient size to accommodate a loading vehicle, such as a fork lift, and yet have sufficient strength to accommodate a normal load. The cargo container includes a rectangular floor or base structure formed of longitudinal and transverse metal skids, and corner metal frame members extending vertically upward from the corners of the base. Longitudinal and transverse metal frame members extend between the upper ends of the corner members to define a rectangular peripherally framed structure. A metal door frame is secured between the base and the upper longitudinal frame member on one side of the structure to define a side door opening. A pair of doors are secured to the door frame for selectively closing the door opening, and panels are secured to the other frame members and the door frame to provide a closed container.

Disclosure

This invention relates to massive cargo containers of the variety that are removably mounted on rail cars, truck trailers, and the like to facilitate bulk shipment of a large number of small containers such as cartons, etc., or other cargo, and is more particularly directed to a cargo container having large area side doors to accommodate sidewalk and dock side loading and unloading.

Cargo containers of the type that are adapted for conveyance on rail cars, truck trailers, etc., are usually provided with end doors to facilitate loading and unloading of smaller containers or other objects into and out of the cargo container. By virtue of the end positioning of the doors, sidewalk and dock side loading and unloading are precluded when the cargo container is mounted in position on a rail car, truck trailer, or equivalent conveyance vehicle. Although a side door may be provided, the size of the door opening which can be tolerated in the side of a conventional cargo container without severely reducing the loading capacity, strength, and stability thereof is limited. More particularly, if a conventional cargo container were provided with a door opening of a size sufficient to permit the driving of a large fork lift therethrough, the unsupporting area represented by the opening would greatly weaken the container and thereby reduce its loading capacity.

It is therefore a primary object of the present invention to provide a cargo container which while having side doors closing an opening of sufficient size to accommodate a large fork lift, still possesses a substantial loading capacity.

Another object of the invention is to provide a cargo container of the class described wherein plywood panels secured to a metal frame function as shear panels to stably support the floor system and the load.

Still another object of the invention is the provision of a metal framed plywood panel cargo container with both side and end doors and which is capable of supporting a number of cargo containers stacked thereon.

It is yet another object of the invention to provide a cargo container of the class described having a pair of side doors which, when pivoted open, lie flat against the side of the container.

A further object of the invention is the provision of a cargo container of the class described wherein locks and other hardware associated with the doors are recessed to prevent damage.

A still further object of the invention is to provide a cargo container of the type outlined hereinbefore which is relatively easy to assemble.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIGURE 1 is a side perspective view of a cargo container in accordance with the present invention.

FIGURE 2 is a fragmentary inside perspective view of the container with portions broken-away.

FIGURE 3 is a fragmentary end perspective view of the container.

FIGURE 4 is a sectional view taken at line 4—4 of FIGURE 3, illustrating particularly the construction of the container adjacent one of the side doors.

FIGURE 5 is a sectional view taken at line 5—5 of FIGURE 3, illustrating the construction at a corner of the container.

FIGURE 6 is a sectional view taken at line 6—6 of FIGURE 3, illustrating the construction at a top edge of the container.

FIGURE 7 is a sectional view taken at line 7—7 of FIGURE 3, illustrating the construction at a bottom edge of the container.

FIGURE 8 is a sectional view taken at line 8—8 of FIGURE 3, illustrating the construction at an end of the container.

FIGURE 9 is a sectional view taken at line 9—9 of FIGURE 3, illustrating the construction of the container at its top edge adjacent the side doors.

FIGURE 10 is a fragmentary sectional view of a preferred fastener arrangement for securing the panels to the frame of the container.

Referring to FIGURES 1–3 in detail, a cargo container 11 in accordance with the present invention is of rectangular design and includes a rectangular flooring system 12, opposed rectangular side walls 13 and rectangular end walls 14, 16 extending upwardly from the flooring system, and a top wall 17 secured to the upper edges of the side and end walls. The flooring system 12 includes longitudinal and transverse skids 18 and 19 on the underside thereof to facilitate sturdy support of the container on a horizontal surface. One end wall 14 is defined by a pair of doors 21, 22 respectively hingedly connected at one of their side edges to the end edges of the opposed side walls 13. The doors are provided with lock handles 23, 24 to facilitate locking of the doors in closed position, and keeper rods 26, 27 are removably secured between the flooring system 12 and top wall 17 to provide rigid exterior backing support to the doors.

It will be appreciated that the cargo container 11, to the extent outlined above is substantially conventional. Without the departures from conventional design described below, such a cargo container could only be end loaded through the doors 21, 22. With the cargo container mounted upon a rail car, truck trailer, or the like, sidewalk or dock side loading would be precluded.

In accordance with the particularly salient aspects of the invention, the foregoing difficulty is overcome by the provision of a large area door opening 28 centrally of one side wall 13. The opening is closed as by means of a pair of doors 29, 31 respectively hingedly connected along one side edge to the side wall adjacent the opposed side edges of the opening. The doors are fitted with lock handles 32, 33 to facilitate locking thereof in closed position with their inner side edges in abutment. Keeper rods 34, 36 are secured between the flooring system 12 and top wall 17 exteriorly adjacent the doors 29, 31 to provide rigid backing support therefor. The area of the door opening 28 is sufficiently large that when the doors 29, 31 are open a large fork lift may be driven through the opening. In this regard, the opening is typically at least one-fourth the area of the overall side wall 13. For example, with a side wall 20 feet long by 7 feet high, a door opening 6 feet wide by slightly less than 7 feet high is typically provided. Despite the large size of the opening, the container is not weakened and there is no reduction in the loading capacity from that possessed by a container not provided with side doors. More particularly, by virtue of a unique metal frame and wood panel construction employed in the cargo container of the present invention, the non-supporting area that would normally be represented by the side door opening is compensated for.

Considering now the construction of the cargo container in detail, it is to be noted that same includes four vertical corner frame members 37 rigidly secured to the four corners of the skid structure formed by the longitudinal and transverse skids 18, 19. Secured between the upper ends of the two corner frame members 37 on each side of the skid structure, there is provided a longitudinal frame member 38. Similarly, transverse frame members 39 are secured between the pairs of corner members 37 at the opposite ends of the skid structure. At the end 16 of the container opposite that to which the doors 21, 22 are attached, the frame structure is preferably reenforced by a transverse frame member 41 secured between the corner members 37 thereat. In addition, a plurality of vertical frame members 42 are preferably secured between the transverse member 41 and the skid structure at transversely spaced positions. To provide structural rigidity in the vicinity of the side door opening 28, there is provided a door frame 43 including an upper longitudinal door frame member 44 secured to the longitudinal member 38, and vertical door frame members 47, 48 respectively secured between the opposite ends of the upper longitudinal door frame members and the skid structure. All of the frame members are preferably of hollow rectangular tubular construction so as to possess structural rigidity, while being of light weight. The frame members are preferably formed with flanges, as will be subsequently described in detail, to facilitate the securance of wood panels 49, preferably of plywood, thereto. Such panels function as shear elements for supporting the load and flooring system 12. Additional panels secured to the top of the skid structure form a part of the flooring system.

The doors 29, 31 are likewise best provided as composites of metal frame and plywood panels. More particularly, the doors preferably each include a rectangular metal frame 51 including upper and lower longitudinal frame members having their opposite ends interconnected by longitudinally spaced vertical frame members. Plywood panels 57 are rigidly secured within the frame 51. Suitable hinge means 58, subsequently described in detail, secure the vertical members of the frames 51 of the doors 29, 31 to the vertical door frame members 47, 48 to thus hingedly mount the doors.

Considering now the preferred configurations of the various frame members employed in the cargo container construction, and referring first to FIGURE 5, it will be noted that each of the corner frame members 37 is of a hollow angle configuration. More particularly, each corner frame member is preferably formed of an outer angle having right angularly related vertical legs 59, 61 and an inner angle having right angularly related vertical legs 62, 63 in inwardly spaced parallel relation to the legs of the outer angle and provided with right-angularly outwardly turned strips 64, 66 extending into securance with the legs 59, 61. In this regard, the strips 64, 66 are secured to the legs 59, 61, as by welding, at positions spaced inwardly from the leg edges. Thus, the portions of the legs 59, 61 extending outwardly beyond the strips 64, 66 define flanges 67, 68 for facilitating the attachment of the panels 49.

The longitudinal frame members 38 are preferably provided as shown in FIGURE 6. Each frame member is of hollow substantially rectangular cross section and provided with a flange 69 projecting from the lower wall of the member to support panels defining the top wall 17, and a flange 71 extending from the outer side wall of the member to facilitate attachment of panels defining the side walls 13. Each frame member 38 is advantageously formed by a substantially channel shaped element defined by parallel legs 72, 73 interconnected by a web 74, and an angle element 76 secured as by welding to the channel element. Leg 72 is provided with a right angularly outwardly turned lower portion defining the flange 69 and one leg 77 of angle element 76 is secured to the flange. The other leg 78 of the angle element extends upwardly from leg 77 at a slightly less than 90° angle into securance with the web 74 adjacent leg 73. Leg 73 extends beyond the leg 76 to define the flange 71. The transverse frame members 39 are provided in a manner similar to the longitudinal frame members.

As shown in FIGURE 7, the sides of the skid structure are provided with lateral offsets 79 terminating in vertically projecting flanges 81. The offsets facilitate securance of the panels 49 to the skid structure in the formation of the flooring system 12. The flanges 81 facilitate base securance of the panels included in the side walls 13 of the container.

FIGURE 8 illustrates the preferred construction of the transverse and vertical reenforcing members 41 and 42 at end wall 16 of the container. In this regard, a transverse plate 82 extends vertically upward from the corresponding end of the skid structure. The member 41 is then preferably provided as a transverse channel having its parallel side legs welded, or otherwise secured to the interior surface of plate 82 at a position downwardly spaced from the upper edge thereof. The portion of the plate that extends above the member 41 defines a flange 83 for facilitating attachment of the panels 49 employed in the construction of end wall 16. There is also preferably provided a transverse channel 84 secured to the interior surface of plate 82 adjacent the skid structure. The members 42 are then provided as vertical channels having their parallel side legs welded to the interior surface of the plate and extending between the members 41, 84.

Considering now the preferred construction of the door frame 43, and referring to FIGURES 4 and 9, it will be noted that each of the vertical door frame members 47, 48 is of hollow angle configuration. More particularly, each of these members preferably includes an outer angle element 84 having right angularly related legs 86, 88 with right angularly projecting flanges 89, 91 at the vertical side edges thereof. There is additionally provided an inner angle member 92 defined by right angularly related legs 93, 94 parallel to the legs 86, 88. Leg 94 is formed with a right angularly projecting flange 96 parallel and secured to the flange 91, as by welding. The leg 39 extends into right angular engagement and securance with flange 89 at a position spaced from its vertical edge. The portion of the flange 89 extending outwardly from leg 93 facilitates securance of the panels 49 of the side wall 13 to the door frame 43.

The upper longitudinal door frame member 44 is preferably of hollow rectangular design including a lateral offset to provide a longitudinal shoulder in co-planar relation to the legs 88 of the vertical door frame members 47, 48. In this regard, frame member 44 advantageously comprises an outer angle element 97 including right-angularly related legs 98, 99 with right angular flanges 101, 102 at the longitudinal edges thereof. Flange 101 is parallel and secured to the flange 93 of longitudinal frame member 38. In addition, a longitudinal plate member 103 having oppositely right-angularly directed flanges 104, 106 at the opposite longitudinal edges thereof is provided with the flange 104 parallel and secured to the flange 102 of outer angle element 97 and the flange 106 parallel and secured to the leg 77 of the longitudinal frame member 38. In this manner, the legs 88 of the vertical door frame members 47 and the leg 98 of the longitudinal door frame member 44 provide a recessed door jamb for the doors 29, 31.

The frame 51 of each of the doors 29, 31 is preferably provided as a peripheral transverse strip 107 having vertical flanges 108 projecting right-angularly inward from its inner edges in the vertical side portions thereof, and longitudinal flanges 109 projecting right-angularly downward and upward from its inner edges in the top and bottom portions thereof. One vertical portion of the strip 107 and upper portion thereof are additionally respectively provided with vertically and longitudinally extending flanges 111 and 112 projecting right angularly outward from the outer edge of the strip. The panels employed in the doors are secured to the flanges 108, 109 and are thus peripherally encompassed by the strip 107. The interior faces of the flanges 111, 112 engage the recessed door jam provided in the door frame 43 in the manner previously described. Each hinge means 58 is then preferably provided as an angle plate 113 having one leg secured to flange 111 and the other leg journalled at its free end as by means of a pivot 114 mounted on leg 86 of door frame member 47 adjacent its intersection with flange 89. In this manner, the doors are hingedly mounted in recessed position and yet may be pivoted to open positions against the side wall 13 on opposite sides of the door opening. By virtue of the recessed mounting of the doors, the lock handles 32, 33 are likewise recessed with respect to the sidewall 13, and the keeper rods 34, 36 may be mounted in recessed positions. The lock handles, keeper rods, and other hardware associated with the doors are thus protected against damage.

FIGURE 10 illustrates a preferred form of fastener means employed in the securance of the panels 49 to the frame structure. The fastener means each include a stud bolt 116 welded to the frame structure. A panel 49 is provided with a relatively enlarged bore 117 for receiving the stud bolt. A cap nut 118 having a periphery of a size substantially equal that of bore 117 is threadably engaged on the stud bolt. The nut is thus engaged in the bore and an outwardly flared annular flange 119 provided on the nut engages the face of the panel.

What is claimed is:

1. A cargo container comprising a rectangular floor system, corner metal frame members extending vertically upward from the corners of said flooring system, longitudinal and transverse metal frame members extending between the upper ends of said corner members to define a rectangular peripherally framed structure, a metal door frame secured between the flooring system and said longitudinal frame member on a first side of said structure to define a side door opening, panels secured to said frame members and said door frame to provide a closed container with a side door opening, and door means secured to said door frame for selectively closing said opening, said frame members and door frame being of generally rectangular tubular construction and provided with flanges to which said panels are secured.

2. A cargo container according to claim 1, wherein said opening has an area of at least about one-fourth of the area of said first side.

3. A cargo container according to claim 1, wherein said panels are of plywood.

4. A cargo container according to claim 1, wherein one end of said structure is closed by door means.

5. A cargo container according to claim 1, wherein said door frame is formed with a recessed jamb, and said door means comprises a pair of doors each having a metal frame and panels secured thereto, said frames of said doors having portions engaging said jamb, and hinge means securing vertical side portions of said frames of said doors to vertical side portions of said door frame.

6. A cargo container according to claim 1, further defined by said framed structure and said door frame have stud bolts projecting inwardly therefrom, said panels having enlarged bores receiving said stud bolts, and cap nuts threadably engaging said bolts and engaged within said bores, said nuts having outwardly flared annular flanges engaging faces of said panels about said bores.

7. A cargo container comprising rectangular skid structure formed of longitudinal and transverse metal skids, corner metal frame members extending vertically upward from the corners of said skid structure, longitudinal and transverse metal frame members extending between the upper ends of said corner members to define a rectangular peripherally framed structure including opposed sides, opposed ends, and a top, a door frame in a first of said sides including a longitudinal door frame member secured to one of said longitudinal frame members and vertical door frame members extending between the opposite ends of said longitudinal door frame member and said skid structure, each of said corner frame members including outer and inner angle elements having right angularly related parallel spaced legs, said legs of said inner angle element having right-angularly outwardly turned strips extending into securance with said legs of said outer angle element at positions spaced inwardly from the edges of the legs of said outer angle element, the portions of said legs of said outer angle element outwardly from said strips of said inner angle element defining flanges, said longitudinal and transverse frame members each including a channel element having parallel legs and an interconnecting web, a first of said legs of said channel having a right-angularly outwardly turned portion, said longitudinal and transverse frame members each including an angle element with a first leg parallel and secured to said outwardly turned portion of said first leg of said channel element and a second leg extending from the first leg at an angle slightly less than 90° into securance with the web of said channel element, said outwardly turned portion of said first leg of said channel element and the second leg thereof defining flanges, said vertical door frame members each including an outer angle element having right angularly related legs with right angularly projecting flanges at the side edges thereof, said vertical door frame members each including an inner angle element having right angularly related legs with a first thereof having a right angularly turned flange parallel and secured to a first of said flanges of said outer angle element and second leg secured to the second flange of said outer angle element at a position spaced from the outer edge thereof, said longitudinal door frame member including an outer angle element having right angularly related legs with right angular flanges at the longitudinal edges thereof, a first of said flanges of said outer angle element of said longitudinal door frame member parallel and secured to second leg of said channel element of said longitudinal frame member, said longitudinal door frame member including an inner longitudinal plate element having oppositely right-angularly directed flanges at the opposite longitudinal edges thereof, a first of said flanges of said plate element parallel and secured to the second of said flanges of said outer angle element of said longitudinal door frame member, the second of said flanges of said plate element parallel and secured to said first leg of said angle element of said longitudinal frame member, the vertical one of said legs of said outer angle element of said longitudinal door frame member and the vertical ones of said legs of said outer angle elements of said vertical door frame members defining a door jamb about a door opening, plywood panels secured to the flanges of said skid structure, said longitudinal and transverse frame members, and said longitudinal and vertical door frame members, plywood panels secured to said skid structure in covering relation thereto, and a pair of doors closing said door opening, each of said doors having a frame including a transverse rectangular peripheral strip with vertical flanges extending inwardly from the inner edges thereof and vertical flanges extending outwardly from the outer edges of one vertical portion and the top portion of said strip and engaging said jamb, said frames of said doors hingedly secured to said vertical door frame members, said doors including plywood panels secured to the flanges extending inwardly from the inner edges of said strips of the frames of said doors.

8. A cargo container according to claim 7, wherein said door opening has an area of at least about one-fourth of the area of said first side of said framed structure.

9. A cargo container according to claim 7, further defined by said flanges of said skid structure, said longitudinal and transverse frame members, and said vertical and longitudinal door frame members having stud bolts projecting inwardly therefrom, said panels having enlarged bores receiving said stud bolts, and cap nuts threadably engaging said bolts and engaged within said bores, said nuts having outwardly flared annular flanges engaging faces of said panels about said bores.

References Cited

UNITED STATES PATENTS 2,017,057  10/1935  Fitch _____ 220—1.5
2,135,526  11/1938  Norbom _____ 220—1.5

JAMES B. MARBERT, *Primary Examiner.*